(12) United States Patent
Jax et al.

(10) Patent No.: US 9,093,065 B2
(45) Date of Patent: Jul. 28, 2015

(54) METHOD AND DEVICE FOR TRANSCODING AUDIO SIGNALS EXCLDUING TRANSFORMATION COEFFICIENTS BELOW –60 DECIBELS

(75) Inventors: Peter Jax, Hannover (DE); Sven Kordon, Hannover (DE)

(73) Assignee: THOMSON LICENSING, Boulogne-Billancourt (FR)

(*) Notice: Subject to any disclaimer, the term of this patent is extended or adjusted under 35 U.S.C. 154(b) by 1555 days.

(21) Appl. No.: 12/311,129

(22) PCT Filed: Sep. 6, 2007

(86) PCT No.: PCT/EP2007/059349
§ 371 (c)(1),
(2), (4) Date: Mar. 19, 2009

(87) PCT Pub. No.: WO2008/034723
PCT Pub. Date: Mar. 27, 2008

(65) Prior Publication Data
US 2009/0240507 A1    Sep. 24, 2009

(30) Foreign Application Priority Data
Sep. 20, 2006 (EP) .................................... 06120969

(51) Int. Cl.
*G10L 19/00* (2013.01)
*G10L 25/00* (2013.01)
(Continued)

(52) U.S. Cl.
CPC .............. *G10L 19/022* (2013.01); *G10L 19/173* (2013.01); *G06F 3/16* (2013.01); *G10L 19/005* (2013.01); *G10L 19/008* (2013.01); *H04B 1/66* (2013.01)

(58) Field of Classification Search
CPC ....... G10L 19/008; G10L 19/005; G06F 3/16; H04B 1/66
USPC ........................................................ 704/212
See application file for complete search history.

(56) References Cited

U.S. PATENT DOCUMENTS

| 7,590,532 | B2 | 9/2009 | Suzuki et al. | |
| 2004/0002855 | A1 | 1/2004 | Jabri et al. | |
| 2004/0024592 | A1* | 2/2004 | Matsunuma | 704/212 |
| 2007/0250308 | A1* | 10/2007 | Lee et al. | 704/200 |
| 2008/0260048 | A1* | 10/2008 | Oomen et al. | 375/241 |

FOREIGN PATENT DOCUMENTS

| CA | 2482427 | 10/2003 |
| EP | 1080576 | 7/2008 |

(Continued)

OTHER PUBLICATIONS

K. Takagi et al. "Conversion of MP3 to AAC in the Compressed Domain" Multimedia Signal Processing, 2006 IEEE 8$^{th}$ Workshop on, Oct. 2006, pp. 132-135, XP002415902.

(Continued)

*Primary Examiner* — Farzad Kazeminezhad
(74) *Attorney, Agent, or Firm* — Tutunjian & Bitetto, P.C.

(57) ABSTRACT

The present invention provides method and device for transcoding between audio coding formats with different time-frequency analysis domains, as used for example by MPEG-AAC and mp3, particularly for facilitated and faster transcoding between such audio signals. A method for transcoding a framed audio signal from a first parameter domain into a second parameter domain comprises linearly transforming two or more parameters of the first parameter domain to at least one parameter of the second parameter domain, wherein the two or more parameters of the first parameter domain come from different frames of the audio signal in the first parameter domain. The linear transformation can be described as a matrix and implemented as a look-up table, wherein the matrix transformation coefficients below -60 Decibels are neglected.

28 Claims, 5 Drawing Sheets

(51) Int. Cl.
  *H04B 1/66* (2006.01)
  *G10L 19/022* (2013.01)
  *G10L 19/16* (2013.01)
  *G06F 3/16* (2006.01)
  *G10L 19/008* (2013.01)
  *G10L 19/005* (2013.01)

(56) References Cited

FOREIGN PATENT DOCUMENTS

| JP | 2003223189 | 8/2003 |
|----|------------|--------|
| WO | WO03088212 | 10/2003 |
| WO | WO 2005/078707 | 8/2005 |
| WO | WO 2006/024977 | 3/2006 |

OTHER PUBLICATIONS

M. Hans et al: "An MPEG Audio Layered Transcoder" Preprints of Papers Presented At the AES Convention, Sep. 1998, pp. 1-18, XP001014304.

Search Report Dated Oct. 1, 2007.

T. Painter and A. Spanias (2000). Perceptual Coding of Digital Audio, Proceedings of the IEEE, vol. 88, No. 4, Aug. 6, 2002, pp. 451-513.

Ahmad et al., "Video Transcoding: An Overview of Various Techniques and Research Issues", IEEE Transactions on Multimedia, vol. 7, No. 5, Oct. 1, 2005, pp. 793-804.

Bang et al., "Audio Transcoding Algorithm for Mobile Multimedia Application", Acoustics, Speech and Signal Processing, 2006. ICASSP 2006 Proceedings. 2006 IEEE International Conference on (Volume:3 ), May 14-19, 2006, pp. 1176-1179.

Nahjima et al., "MPEG Audio Bit Rate Scaling on Coded Data Domain", Acoustics, Speech and Signal Processing, 1998. Proceedings of the 1998 IEEE International Conference on (Volume:6 ), May 12-15, 1998, pp. 3669-3672.

Yokotani et al., "Improved Lossless Audio Coding Using the Noise-Shaped IntMDT", Digital Signal Processing Workshop, 2004 and the 3rd IEEE Signal Processing Education Workshop. 2004 IEEE 11th, Issue Date: Aug. 1-4, 2004, pp. 356-360.

Lee et al., "Efficient Aac Single Layer Transcoder", Proc. Of 117th AES Convention, San Francisco, CA, USA, Oct. 28, 2004, pp. 1-5.

\* cited by examiner

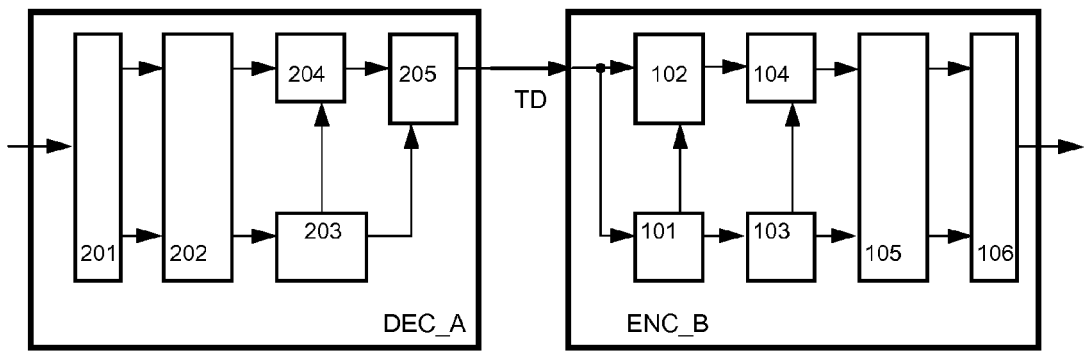
Fig.3                    Prior Art
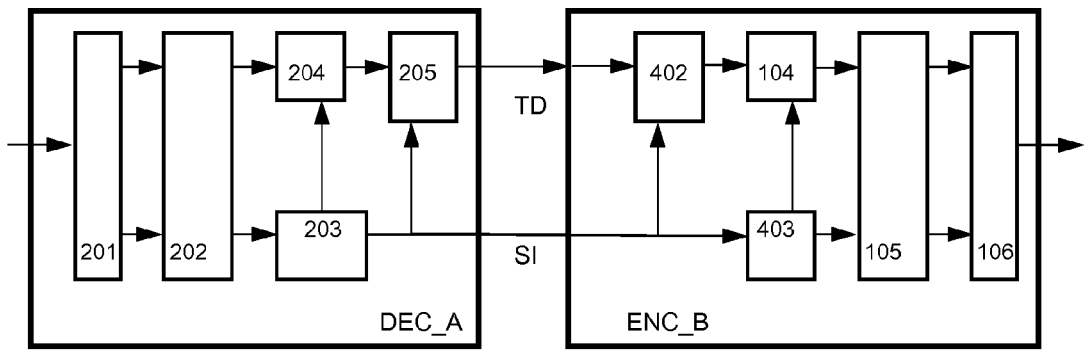
Fig.4 a)                 Prior Art
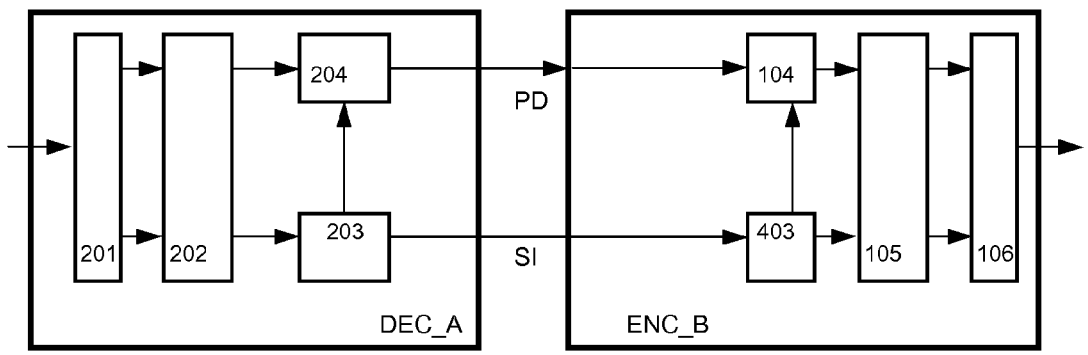
Fig.4 b)                 Prior Art

US 9,093,065 B2

METHOD AND DEVICE FOR TRANSCODING AUDIO SIGNALS EXCLDUING TRANSFORMATION COEFFICIENTS BELOW −60 DECIBELS

This application claims the benefit, under 35 U.S.C. §365 of International Application PCT/EP2007/059349, filed Sep. 6, 2007, which was published in accordance with PCT Article 21(2) on Mar. 27, 2008 in English and which claims the benefit of European patent application No. 06120969.8, filed Sep. 20, 2006.

FIELD OF THE INVENTION

This invention relates to a method and a device for transcoding audio signals. It is relevant to the field of audio compression, and more specifically to the field of transcoding between different perceptual audio coding formats. However, it may also be advantageous to use the basic concept of the invention in other audio processing applications.

BACKGROUND

The term "audio transcoding" usually denotes the derivation of a bit stream representing an audio signal according to a specific audio coding format from another bit stream, which is organized according to a different audio coding format. In this sense, "transcoding" denotes the full procedure of obtaining e.g. an MPEG AAC compliant bit stream from an MPEG 1 layer III (mp3) compliant bit stream.

In this document, however, the term "audio transcoding" is used in a more technical sense to describe the conversion of the audio signal from one sub-band or transform domain to another. That is, the term describes just one principal step in the conversion from one representation to another one, instead of the full procedure.

The basic principle of generic perceptual audio encoding as known from literature[1] is shown in FIG. 1.

[1] T. Painter and A. Spanias (2000): Perceptual Coding of Digital Audio, Proceedings of the IEEE, vol. 88

Today's compression methods and formats for audio signals generally use a time-frequency analysis 102, i.e. a filter bank or a transform, to represent the parameters 110 of the audio signal 107. These parameters are subject to quantization and encoding 104, entropy coding 105 and bit stream operations 106; all of these steps are controlled by a psycho acoustic analysis 101 of the input audio signal. FIG. 2 shows a corresponding generic perceptual audio decoder with bit stream operations 201, entropy decoding 202, bit allocation 203, decoding and de-quantization 204 and finally time-frequency synthesis, which generates the time domain signal 214 from parameters 212,213.

FIGS. 1 and 2 illustrate and exemplify the basic principle of perceptual audio codecs. However, although particular implementations may differ to a certain extent, they usually employ time-frequency analysis and the inverse thereof, the time-frequency synthesis.

Focusing now on the time-frequency analysis and synthesis, the intermediate encoding and decoding steps will not be considered further.

For the time-frequency analysis 102, numerous different algorithms are used in today's audio codecs. For example, the MPEG audio codec standards include the MPEG-1 layer I and II codecs, which use a 32-band pseudo-QMF (quadrature mirror filter) filter bank, and MPEG-1 layer III (mp3) that employs a hybrid filter bank, namely a cascade of a 32-band pseudo-QMF filter bank followed by an MDCT (modified DCT) filter bank. The MDCT filtering (default 18 bins, reduced to 6 bins for transients) leads to a spectral resolution of 576 or 192 bins, respectively. The MPEG AAC codec and derivatives thereof use a full-band MDCT approach with a default resolution of 1024 bins (reduced to 256 bins for transients). Audio frames are often temporally overlapping to a certain extent, e.g. 50%, which defines the so-called frame advance (100%-overlap)*frame_size.

In the sequel, the domain between the output of the time-frequency analysis 102 and the input of the time-frequency synthesis 205 (wherein the output signal 116 of the encoder is input 206 to the decoder) will be denoted as "frequency domain" or "parameter domain", regardless whether the specific audio coding format uses a filter bank or block transform for the time-frequency analysis.

Owing to the ever increasing number of existing and emerging audio formats, there is rising need for algorithms for transcoding audio content from one bit stream format to another. FIG. 3 shows an approach to audio transcoding that is typically used today, because it involves only available standard modules already described in FIGS. 1 and 2. The input bit stream encoded in a source format is decoded DEC_A into the continuous time domain PCM signal TD. An independent encoder ENC_B produces then a new bit stream according to the target format. The only interface between the signal processing blocks is the time domain audio signal TD that is passed from the decoder to the encoder.

Although this approach is simple to use, the following problems occur. First, since the two blocks DEC_A, ENC_B do not know from each other, the time-frequency analysis procedures may be desynchronized: in general there is a series of operations for decoding (de-quantization) and encoding (quantization) which leads to degradations of the signal quality, so-called tandem errors. Second, the computational complexity of the approach is high, so that it is desirable to reduce it significantly.

A better transcoding result can be obtained if some side information that is to a certain extent common to source and target formats is extracted by the decoder and reused in the encoder. FIG. 4a) shows an example for this approach, which can be used e.g. for transcoding from the Dolby AC-3 to the BSAC (Bit Sliced Arithmetic Coding) format[2]. In this particular example, the AC-3 bit allocation can be re-used to derive and control a new bit allocation 403 within the BSAC encoder. Besides re-using side information SI from the source bit stream, the time-frequency synthesis and analysis procedures are temporally synchronized. For this case, the advanced concept of FIG. 4a) reduces computational complexity as compared to the previously described transcoding scheme, and may lead to a better quality of the target signal.

[2] Kyoung Ho Bang, Young Cheol Park, and Dae Hee Youn (2006). Audio Transcoding Algorithm for Mobile Multimedia Application, Proc. of ICASSP, vol. 3

If (and only if) the codec formats of source and target bit stream are identical in terms of their time-frequency analysis domain, i.e. the analysis and synthesis blocks are fully complementary (e.g. transcoding of an mp3 bit stream from a given to a lower data rate), the transcoding can be further simplified as shown in FIG. 4b): the time-frequency analysis and synthesis procedures can be omitted, so that the data rate modification takes place directly in the parameter domain PD, e.g. by re-quantizing certain parameters. It is also beneficial to reuse the side information, e.g. the bit allocation, from the source bit stream.

SUMMARY OF THE INVENTION

It is evident from the above description that a simple method and device for transcoding between encoding formats with different time-frequency analysis domains is lacking. One aspect of the present invention is to provide such method and device, particularly for facilitated and faster transcoding between audio signals with different time-frequency analysis domains.

The present invention uses a linear mapping from the source parameter domain to the target parameter domain, wherein target parameters depend on source parameters from two or more input frames. This allows for low complexity transcoding between different time-frequency analysis domains, and prevents the problem of signal degradation by conventional processing.

It has been recognized that the time-frequency synthesis and subsequent time-frequency analysis of the conventional transcoding approach can be expressed as linear operations, which are however usually time variant.

According to one aspect of the invention, a method for transcoding an audio signal from a first or input parameter domain (as opposed to time domain) into a second or output parameter domain comprises the step of mapping parameters of the input parameter domain to parameters of the output parameter domain, wherein at least one output parameter depends linearly on two or more input parameters (i.e. the output parameter is a linear combination of the two or more input parameters). The two or more input parameters come from two or more different input frames.

In one embodiment, the mapping or transformation describing the relationship between said output parameter and said two or more input parameters is time variant. However, for frame structured input and/or output formats it is a sequence of a plurality of time invariant relationships. This is particularly advantageous if the frame advances (describing temporal overlapping of frames) of the time-frequency analysis of the input parameter domain and the time-frequency synthesis of the output parameter domain differ.

In one embodiment, the time variant mapping repeats periodically, i.e. it is a periodical repetition of time invariant mappings.

In one embodiment, the mapping comprises sub-steps of mapping partial input vectors from different source frames, which are then added up or superimposed for a single output frame.

In one embodiment, superframes are created over an integer number of input frames corresponding to an integer number of output frames. The integer numbers depend on the frame lengths and frame shifts of the input and output formats. One superframe may correspond to one or more repetition periods of the time variant mapping.

In one embodiment, each time invariant phase of the time variant relationship is expressed as a linear operation that gets input from a plurality of successive frames of the input format signal and produces output for one frame of the output format signal. Thus, from this periodical repetition results a sequence of linear operations for a superframe.

In one embodiment, the time variant mapping is implemented as a sequence of linear transformations using look-up tables for pre-calculated transformation coefficients. In another embodiment however, the linear transformations are pre-defined analytical expressions, e.g. functions, which are applied to the input parameters.

An advantage of the invention is that the computational complexity required for the direct linear transformation from one parameter domain into another without passing the continuous time domain signal is significantly lower than for the conventional straight-forward transcoding procedure via the continuous time domain signal.

Another advantage is that the trade-off between the transcoding quality and the computational complexity can be adapted to time-varying application demands, even in a frequency-selective manner.

A further advantage is that the direct transcoding via a single linear transform is numerically better conditioned than the conventional transcoding scheme via the time domain signal. Since the influence of specific parameter bins of the source domain is limited to a small range of parameter bins of the target domain, wide-spread effects of quantization and inexact numerical operations (as e.g. common in a fixed-point implementation of conventional transcoding) are minimized.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a generic perceptual audio encoder;

FIG. 3 conventional straight-forward transcoding;

FIG. 4 a) conventional transcoding with re-use of bit allocation;

FIG. 4 b) conventional transcoding between identical audio formats;

DETAILED DESCRIPTION OF THE INVENTION

Figure 1:
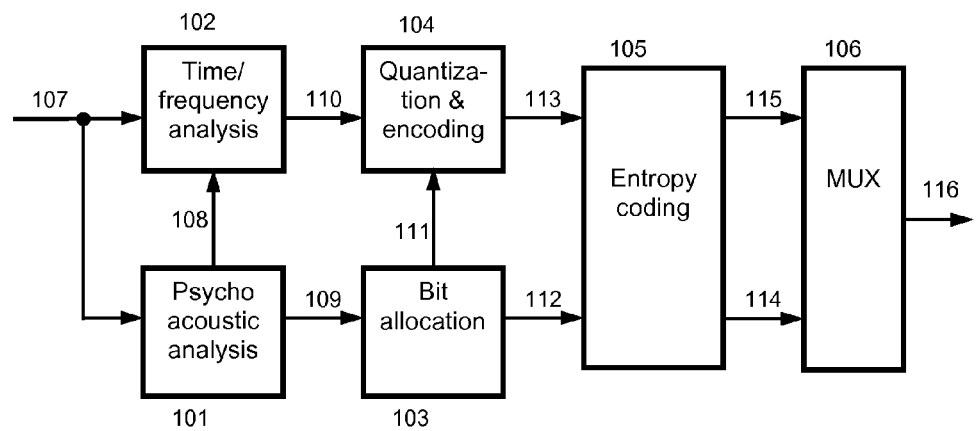
Figure 2:
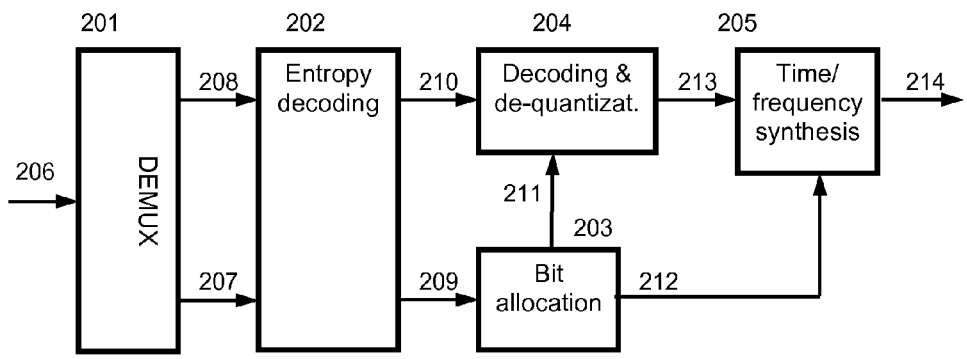
FIG. 2 the structure of a generic perceptual audio decoder.
Figure 5:
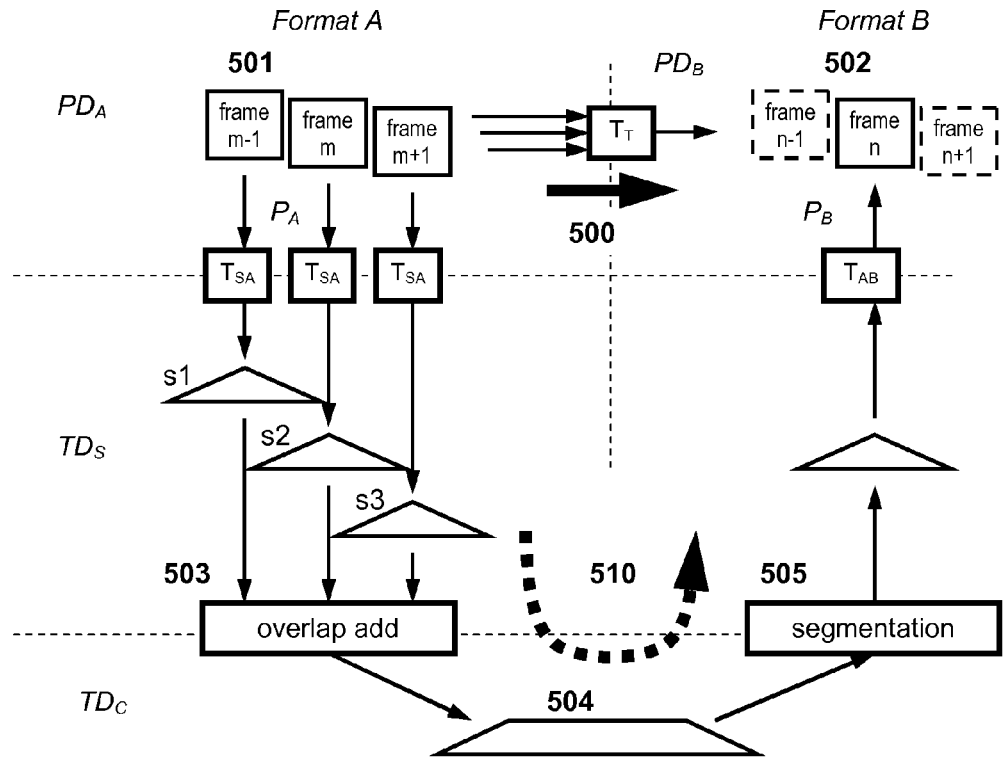
FIG. 5 direct transcoding between different parameter domains.

FIG. 5 shows direct transcoding in the parameter domain between two formats, with the two formats having different parameter domains $PD_A$, $PD_B$. A number of adjacent parameter frames 501 according to a source format A, e.g. mp3, have previously been derived (not shown) from a PCM audio signal by the time-frequency analysis scheme of the source format. Each frame m−1,m,m+1 comprises a number of parameters, and can thus be regarded as a parameter vector in the source parameter domain $PD_A$. A linear transformation matrix $T_T$ is applied to the input parameter vectors 501, and provides an output parameter vector 502 corresponding to a frame in an output parameter domain $PD_B$ of the output format B.

For a single output frame n, the transformation or mapping is time invariant. Regardless whether the transformation matrix $T_T$ is applied to the plurality of input frames simultaneously, or separate transformation matrices are (simultaneously or successively) applied to the respective input frames and the partial results are then added up, the resulting matrix $T_T$ is the same in both cases since the transformation steps are linear.

In principle, the transformation mapping $T_T$ covers all the sub-steps of the conventional processing 510, where each parameter vector $P_A(m), P_A(m+1) \ldots$ is transformed into the corresponding time domain segments TDs by multiplication with a linear transformation matrix $T_{S_A}$ (SA standing for the synthesis according to the source format). In this example, the time segments are overlapping, and fed into an overlap add procedure 503 to obtain the decoded continuous time domain TDc audio signal 504. Then, the time-frequency analysis according to the target format B takes place in the conventional transcoding process. The continuous time domain signal 504 is decomposed 505 into a series of (usually) overlapping segments, wherein the overlap may be different from the overlap employed by format A, and the segment vectors are then transformed into the target parameter domain $PD_B$ by multiplication with the matrix $T_{A_B}$ ($A_B$ standing for analysis (A) according to format B). Since the target format B may apply a different frame shift than the source format A, a separate frame index n is used.

The above description and FIG. 5 are generic in the sense that they cover all time-frequency analysis schemes that are today of practical relevance in audio coding. The matrices $T_{S_A}$ and $T_{A_B}$ can describe exactly any time-frequency synthesis or analysis scheme that is based on linear block transforms and linear feed-forward (FIR, finite impulse response) filter banks. Cascaded structures, e.g. of the hybrid filter bank of the mp3 codec, can be combined in the matrices $T_{S_A}$ and $T_{A_B}$. Also linear non-perfect reconstructing filter banks or transforms are covered. For IIR (infinite impulse response) filter banks, a sufficiently accurate representation can be formulated by approximating the infinite impulse responses with finite impulse responses by clipping negligible values.

The transcoding concept according to the invention exploits the linearity of the time-frequency synthesis and analysis steps $T_{S_A}$, $T_{A_B}$ which are involved in the transcoding process, and of the overlap add and segmentation blocks 503, 505. The sequence of time-frequency synthesis $T_{S_A}$/overlap add 503, segmentation 505 and time-frequency analysis $T_{A_B}$ is replaced by a single linear transformation $T_T$, so that it is advantageously not necessary to generate the continuous time domain signal 504.

In the following, some properties of the linear transformation $T_T$ are described.

An exact derivation of the transformation matrix $T_T$ is possible, but may be non-trivial. Besides the analytical derivation procedure, there is the possibility to train the matrix by simulating and measuring the linear contributions of each parameter element (e.g. spectral bin) of the source parameter domain to a target frame in the target parameter domain. The matrix $T_T$ may e.g. be represented by analytical expressions or by look-up tables.

As a consequence of the overlap add 503 of several consecutive time segments in the conventional transcoding path, the linear transformation $T_T$ will in general not be a one-to-one, but a many-to-one mapping. That means that at least two, typically three or more frames of the source domain have influence on one frame of the target domain. Vice versa, each frame of the source domain affects more than one frame of the target domain.

Figure 6:
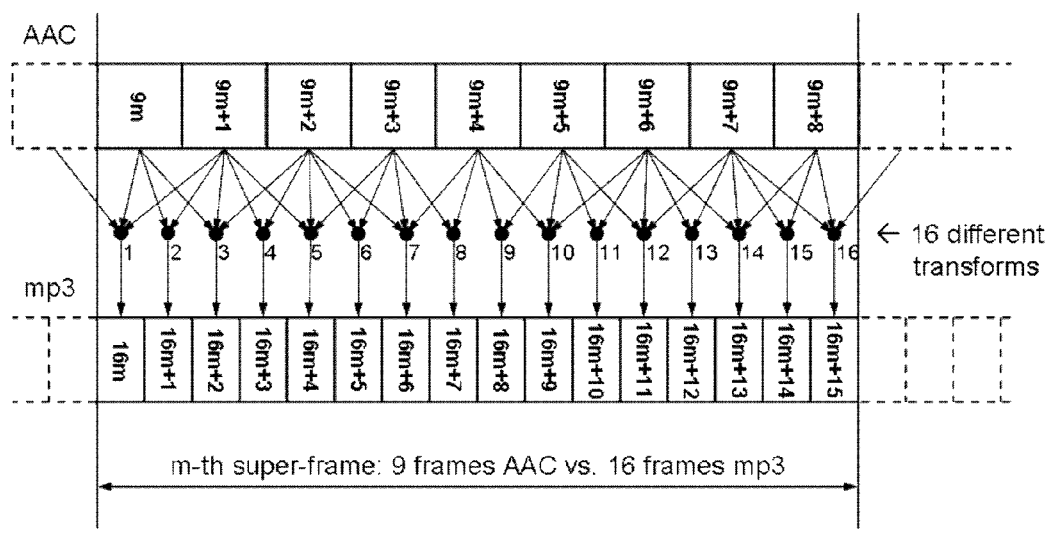
FIG. 6 transcoding between different time-frequency domains with different frame advances.

Although the time-frequency analysis and synthesis procedures that define the parameter domains A and B are assumed to be linear, they are typically time-variant. Therefore, the direct transformation $T_T$ depends on the time domain synchronization of the time segments of the source domain versus those of the target domain. In other words, modification of the timing difference between the frames for representations A and B in general yields another direct transformation matrix $T_T$. Consequently, if the frame shifts of the time-frequency synthesis of the source format and the time-frequency analysis of the target format are different, then the matrix $T_T$ is time-variant. An example is shown in FIG. 6 for transcoding between MPEG AAC (frame advance of 1024 samples) and mp3 (frame advance of 576 samples). The time-variant transform comprises a sequence of sixteen time-invariant transform matrices $T_T$ to be employed in this case (neglecting the window switching schemes). FIG. 6 shows sequences of frequency domain vectors for AAC and mp3. Due to the different frame advances, the time shift between the frames varies with time. Identical time shifts between AAC and mp3 frames occur after a period of nine AAC frames or sixteen mp3 frames, respectively. In this example, this period is a superframe. In each superframe, sixteen different pre-determined transformation matrices (e.g. tables) are used for transcoding from the AAC domain into the sixteen mp3 frames. This sequence of transformations repeats for each superframe. Thus, the transformation (within a superframe) is time-variant.

Generally, the number of transformations in the periodic sequence within a superframe corresponds to the number of frames in the target format. E.g. for transcoding from mp3 to AAC, the time-variant transformation comprises nine time-invariant transformations, one for each frame in the superframe $9m, 9m+1, \ldots, 9m+8$. The relation between the frames is vice versa in this case as compared to FIG. 6, e.g. the second AAC frame $9m+1$ depends on five mp3 frames $16m, \ldots, 16m+4$. However, due to the linearity of the transformations it is also possible to perform separate transformations from one source format frame to one target format frame, and add up the necessary result vectors for obtaining the target frame. For the present example this results in a sequence of forty transformations plus the required addition per target frame.

The term "frame advance" describes the mutual shift of successive time-frequency analysis frames. This depends on the temporal overlap of successive frames, and is different from the temporal duration of a frame.

If the two involved time-frequency analysis procedures exhibit a good separation of adjacent parameter bins and if in addition the spectral resolutions are similar, the transformation matrix $T_T$ is typically sparse and more or less diagonal. That is, large parts of $T_T$ are equal to zero and need not be considered in the transformation. Therefore the transcoding by linear transformation with the matrix $T_T$ can be expected to be computationally significantly less complex than the conventional transcoding method via the continuous time domain signal.

Figure 9:
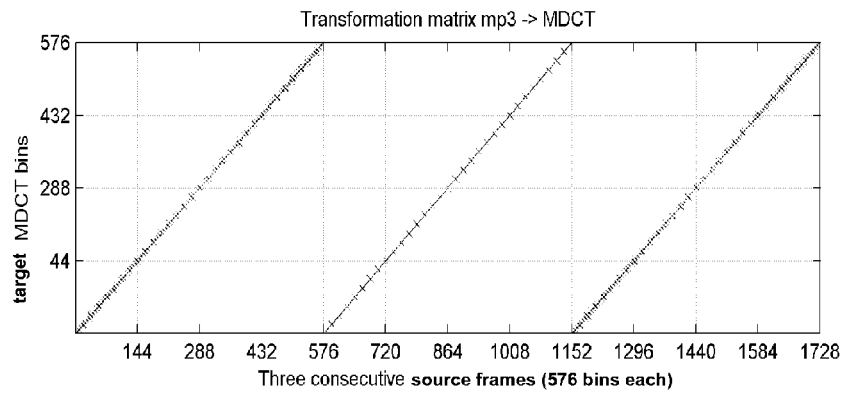
FIG. 9 the coefficients of an exemplary transformation matrix.

An exemplary transformation matrix is shown in FIG. 9. The grey-level indicates the logarithmic magnitude of the coefficients of a transformation matrix $T_T$ for transcoding from the mp3 hybrid filter bank to a full-band MDCT (with long windows for both). Exemplarily, three consecutive mp3 frames influence the target MDCT frame. The value of the coefficients in the dark areas is higher than in the light areas. In this example, the magnitudes of 97.7% of the transformation coefficients are below −60 dB. These coefficients can be neglected for the transcoding, so that the matrix multiplication can be realized with very low computational effort.

Figure 10:
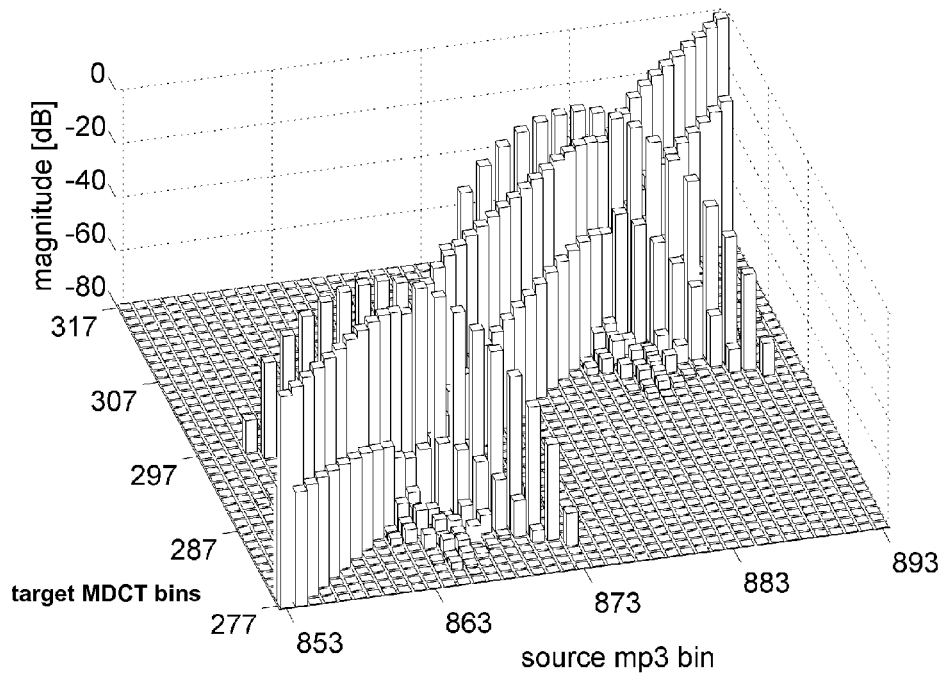
FIG. 10 details of the exemplary transformation matrix.

FIG. 10 shows a detail from the centre region of FIG. 9, illustrated as 3-dimensional bar graph instead of the grey-level code. From the depicted 41*41=1681 coefficients, most are below −60 dB (clipped at −80 dB), that is, negligible. Ideally, only few coefficients along a linear region have values of a relevant level. In this analytically derived example, also additional regions that traverse the linear region in periodical distances of eighteen bins have non-negligible values, caused by an aliasing distortion effect in the mp3 hybrid filter bank: a significant amount of aliasing components remains even though the aliasing correction has been applied in the hybrid mp3 filter bank. This aliasing is not present in the case of full-band MDCT.

For time variant transformations, the transformation matrix $T_T$ according to the FIGS. 9 and 10 may be valid for only one output frame (i.e. a particular frame within each superframe), while for other output frames the coefficients are different.

The computational complexity can further be reduced by taking frequency-selective accuracy requirements into account. For example, if the mp3 core bit stream has a low bit rate, then the high frequency bins are generally not encoded, and they will be set to zero (i.e. masked) in the decoder. In this case, the high frequency part of the transcoding transformation $T_T$ can be omitted. Generally, any frequency range can be easily masked. The masking can also be time-variant and/or signal dependent, e.g. based on bit allocation that is included in the side information. This easy and flexible masking is an advantage compared to conventional transcoding via the continuous time domain signal.

In principle, a transformation matrix $T_T$ describes the transformation for each frequency bin of the target frame in a summarizing manner. Due to the linearity of the transformation, the transformation matrix can be decomposed into sub-matrices, some of which may also be neglected (e.g. when certain target frequency bins are not required). Thus, a slice or share from the full transformation is selected that actually needs to be calculated. For this purpose, e.g. predominating frequencies or side information such as bit allocation of the source and/or target frames can be evaluated.

If the required accuracy of the transcoding is frequency-selective, the utilization of the transformation matrix $T_T$ may be time-variant. For example, in transcoding from one compressed audio format to another one, the frequency-dependent requirements for transcoding accuracy may be determined as a function of the bit allocation of the source or target audio format. E.g. for target frequency bins that demand for a lower transcoding accuracy (one possible reason being that the number of allocated bits is small), less non-zero elements of the matrix $T_T$ have to be considered when computing the transcoding transformation. Thus, the computational complexity can be further reduced.

With the disclosed transcoding scheme, the influence of each parameter bin of the source domain is constrained to a very limited set of parameter bins in the target domain. Therefore, the numerical behavior of the proposed scheme is much better conditioned than for conventional transcoding via the time domain signal. In conventional transcoding, strong signal components at some parts of the frequency spectrum may influence the whole spectrum in the transcoded parameter domain, owing to numerical inaccuracies of the time-frequency synthesis and analysis procedures.

One exemplary embodiment of the invention relates to transcoding from the parameter domain according to the hybrid filter bank employed in MPEG-1 layer III (mp3) into a target parameter domain according to a full-band MDCT or Integer MDCT with identical frame advance and identical amount of frequency bins. An application example is hybrid lossless coding of audio PCM samples on top of an embedded mp3 bit stream. Here, the disclosed fast transcoding scheme is used for prediction of the full-band Integer MDCT bins from decoded mp3 bins. However, the transcoding may involve more than only the current frame of mp3 bins.

Figure 8:
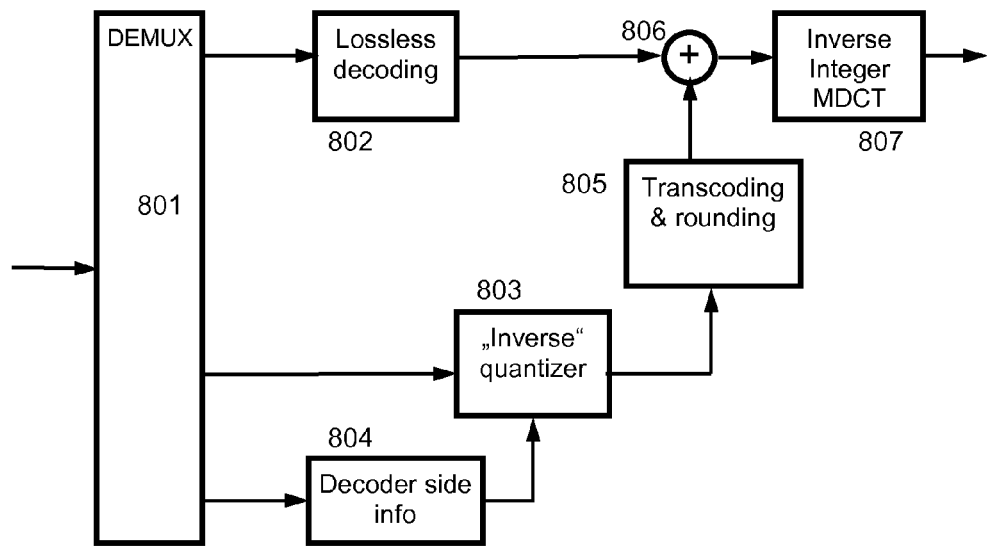
FIG. 8 a decoder for a hybrid mp3 plus lossless extension audio format.

A respective encoder signal-flow is shown in FIG. 8. The lower part of the encoder signal-flow represents a conventional mp3 encoder, including polyphase filter bank and decimation 701, segmentation and MDCT 702, Fast Fourier Transform (FFT) 704, psycho-acoustic analysis 705, bit allocation and quantizer 703, side info encoder 706 and multiplexer 707. In the upper signal path of the hybrid lossless encoder, a parallel segmentation and full-band integer MDCT 709 is applied. The segmentation and control for the full-band MDCT applies the same adaptive window switching scheme as the mp3 core codec. Also, the spectral resolution of the full-band integer MDCT is controlled in accordance to the time-varying spectral resolution of the mp3 filter bank. For concise synchronization of the two parallel time-frequency analysis procedures, especially if a transcoding transformation is utilized that involves more than one mp3 frame (typically three or more), a delay 708 of the PCM samples has to be introduced before the integer MDCT and the corresponding segmentation 709.

The purpose of the full-band integer MDCT 709 and the subsequent signal processing blocks is to allow mathematically lossless encoding of the time domain PCM samples. Therefore, a reversible integer MDCT is used. The concept is comparable to the principle applied in the MPEG SLS (scalable to lossless) audio codec, which however is based on subtraction of the "de-quantized" and rounded mp3 frequency bins from the full-band MDCT bins. However, owing to the significant discrepancies between the mp3 filter bank and full-band MDCT, computing the residual signal by mere subtraction of these "de-quantized" and rounded mp3 frequency bins from the full-band MDCT bins does not lead to a sufficient reduction of signal entropy as required for low rate lossless coding. Hence, the disclosed transcoding scheme according to the invention is used in the encoder and the decoder to determine a more precise prediction of the full-band MDCT bins from the mp3 bins. For this reason, the transcoding transformation 711 (via matrix $T_T$) in general takes at least three mp3 frames into account, after de-quantizing (inverse quantizing 710) their coefficients.

Figure 7:
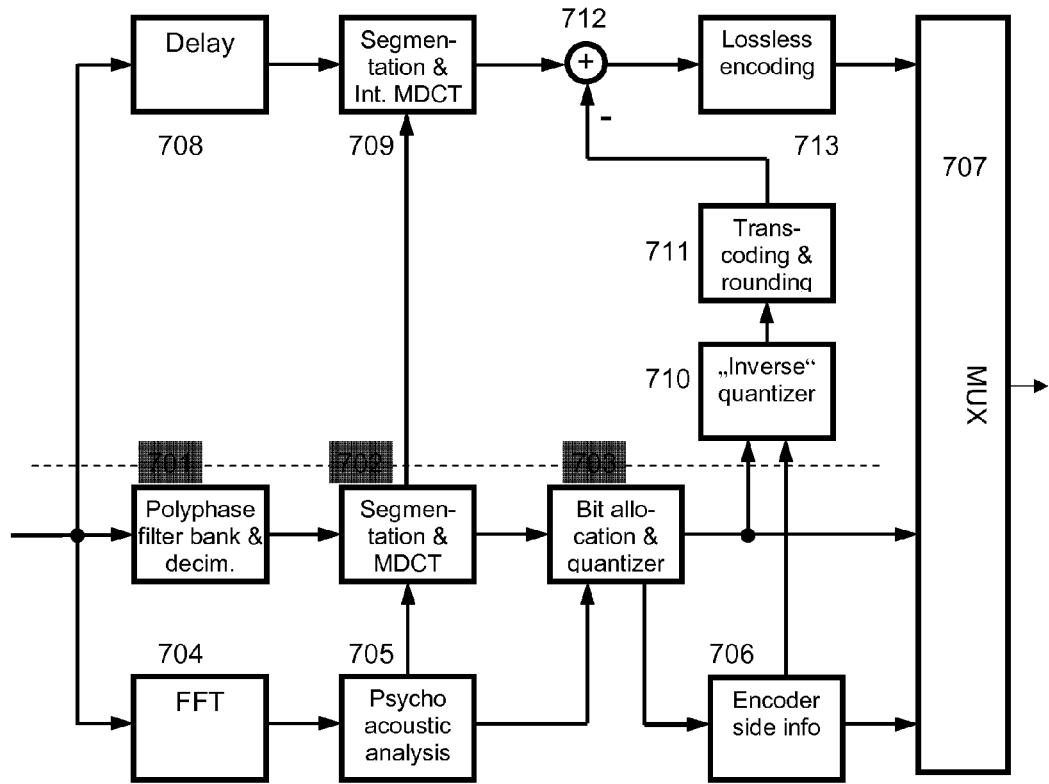
FIG. 7 an encoder for a hybrid mp3 plus lossless extension audio format.

Since the mp3 filter bank 701 applies signal-adaptive switching between short and long analysis/synthesis windows, the transformation matrix $T_T$ is time-variant (not shown in FIG. 7). Different transformations are applied for long windows, short windows and transition phases. E.g. two or more adjacent transformations may be merged into one, or one transformation may be split into two or more, so that the number of different time-invariant transformations per superframe can vary within a stream.

As described above, the computational complexity can be further reduced by frequency-selectivity, e.g. omitting the high and/or low frequency part of the transcoding transformation $T_T$.

A respective decoder for lossless mp3 decoding is depicted in FIG. 8. The transcoding and rounding 805 of the decoder is identical to the transcoding and rounding 711 of the encoder. Also the inverse quantizer 710,803 is identical in the encoder and decoder. The lossless decoding procedure 802 is complementary to the lossless encoding procedure 713, and the side information decoder 804 is complementary to the side information encoder 706.

Another embodiment covers fast transcoding between different audio formats, thus relating to the traditional understanding of the term "transcoding", i.e. conversion of audio content from one compression format to another. Generally, transcoding may start with any frame of the source format.

Figure 11:
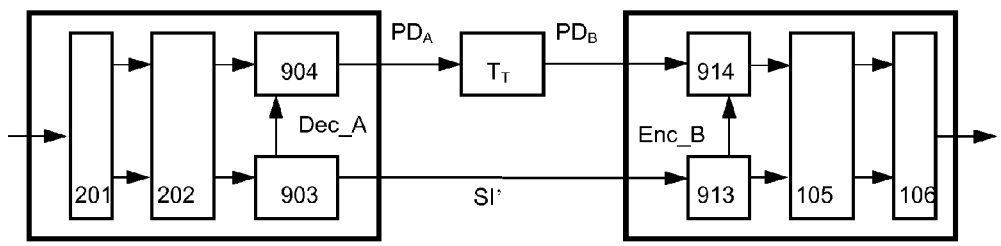
FIG. 11 the structure of a transcoder between different audio formats in the parameter domain.

A block diagram of the proposed system that applies direct transcoding in the parameter domain is illustrated in FIG. 11. Compared to the conventional transcoding system of FIG. 4, this embodiment of the invention replaces the sequence of time-frequency synthesis for the decoder DEC_A and time-frequency analysis for the encoder ENC_B by direct transcoding $T_T$ from the source parameter domain $PD_A$ into the target parameter domain $PD_B$. One advantage of this approach is less computational complexity, thus higher efficiency, and better numerical behaviour meaning less signal distortion. This holds especially for fixed-point implementations with limited accuracy of the mathematical operations that are usually employed for transcoding. Therefore the invention enables faster transcoding from a source audio format to a target audio format, and better quality of the result than conventional transcoding schemes. Further, side information SI' is used similar to the side information in conventional transcoding systems.

The usage of the disclosed algorithms is not limited to full conversion of one coding format to another, but may also be used as a building block of other audio related algorithms, as some of the above embodiments show exemplarily.

Typical exemplary applications of the invention are prediction of time-frequency parameters for lossless coding, high-quality transcoding between different audio formats, and others.

The invention claimed is:

1. A method for transcoding a framed audio signal from a first parameter domain into a second parameter domain, wherein the framed audio signal is a parameter domain representation of a time domain audio signal and wherein each of the first parameter domain and the second parameter domain results from a time-frequency analysis and is suitable for being input to a time-frequency synthesis, the method comprising the step of linearly transforming, in a transcoder, two or more parameters of the first parameter domain to at least one parameter of the second parameter domain without creating said time domain audio signal, wherein the two or more parameters of the first parameter domain come from different frames of the audio signal in the first parameter domain and are obtained by time-frequency transformation;

wherein the step of linearly transforming two or more parameters of the first parameter domain comprises using a look-up table holding transformation coefficients, wherein transformation coefficients below −60 Decibels are neglected.

2. The method according to claim 1, wherein said step of linearly transforming said two or more input parameters to said at least one output parameter is time variant.

3. The method according to claim 2, wherein the time variant linear transformation is a periodical repetition of a plurality of time invariant linear transformations.

4. The method according to claim 3, wherein one period of the periodical repetition covers an integer number of frames of the first parameter domain corresponding to a different integer number of frames of the second parameter domain.

5. The method according to claim 2, wherein substantially all parameters of the second parameter domain are obtained from linearly transformed parameters of the first parameter domain, said linearly transforming being non-trivial.

6. The method according to claim 2, wherein the first and second parameter domains are based on time-frequency analysis using temporal analysis windows, and the time-frequency analysis for the second parameter domain uses long analysis windows and short analysis windows, and wherein said linearly transforming is different for long analysis windows and short analysis windows.

7. The method according to claim 1, wherein said linearly transforming describes at least time-frequency synthesis according to the first parameter domain, overlap add, segmentation and time-frequency analysis according to the second parameter domain.

8. The method according to claim 7, wherein the time-frequency synthesis and/or analysis corresponds to linear block transforms or linear feed-forward filter banks.

9. The method according to claim 1, wherein said transforming comprises omitting a specific frequency portion of the audio signal.

10. The method according to claim 9, wherein said omitting a specific frequency portion of the audio signal is time variant and dependent on bit-allocation used for the audio signal in the first parameter domain.

11. The method according to claim 1, wherein the framed audio signal in said first parameter domain is suitable for obtaining the complete time domain audio signal, and wherein the framed audio signal in said second parameter domain is suitable for obtaining the complete time domain audio signal.

12. The method according to claim 1, wherein said step of linearly transforming comprises the steps of mapping partial input vectors from different input frames to partial output vectors; and superimposing the partial output vectors to generate an output frame.

13. The method according to claim 1, wherein the step of linearly transforming two or more parameters of the first parameter domain comprises using pre-defined analytical expressions.

14. The method according to claim 1, wherein audio frames of the first parameter domain have different frame advance than audio frames of the second parameter domain, wherein frame advance describes temporal overlapping of frames.

15. The method according to claim 1, wherein said different parameters of the first and the second parameter domain are parameters that refer to time-frequency analysis and time-frequency synthesis, and the first and the second parameter domain use different time-frequency analysis and/or different time-frequency synthesis.

16. The method according to claim 1, wherein the parameters of each frame of the first parameter domain affect more than one frame of the second parameter domain, and represent the waveform of the audio signal.

17. A device for transcoding a framed audio signal from a first parameter domain into a second parameter domain, wherein the framed audio signal is a parameter domain representation of a time domain audio signal and wherein each of the first parameter domain and the second parameter domain results from a time-frequency analysis and is suitable for being input to a time-frequency analysis, the device comprising an encoder configured to calculate at least one parameter of the second parameter domain by linearly transforming two or more parameters of the first parameter domain, wherein the two or more parameters of the first parameter domain come from different frames of the audio signal in the first parameter domain and are obtained by time-frequency transformation, and wherein no time domain representation of said audio signal is created;

wherein the step of linearly transforming two or more parameters of the first parameter domain comprises using a look-up table holding transformation coefficients, wherein transformation coefficients below −60 Decibels are neglected.

18. The device according to claim 17, wherein said encoder performs linear transformation using at least time-frequency synthesis according to the first parameter domain, overlap add, segmentation and time-frequency analysis according to the second parameter domain.

19. The device according to claim 18, wherein the time-frequency synthesis corresponds to one or more linear block transforms or linear feed-forward filter banks.

20. The device according to claim 17, wherein said encoder performs transforming by omitting a specific frequency portion of the audio signal.

21. The device according to claim 20, wherein said omitting a specific frequency portion of the audio signal is time variant and dependent on bit-allocation used for the audio signal in the first parameter domain.

22. The device according to claim 17, wherein the framed audio signal in said first parameter domain is suitable for obtaining the complete time domain audio signal, and wherein the framed audio signal in said second parameter domain is suitable for obtaining the complete time domain audio signal.

23. The device according to claim 17, wherein said encoder linearly transforms said two or more input parameters to said at least one output parameter in a time variant manner.

24. The device according to claim 17, further comprising one or more look-up tables configured to store and retrieve transformation coefficients.

25. The device according to claim 17, further comprising an evaluator configured to evaluate pre-defined analytical expressions.

26. The device according to claim 17, wherein audio frames of the first parameter domain have different frame advance than audio frames of the second parameter domain, wherein frame advance describes temporal overlapping of frames.

27. The device according to claim 17, wherein said different parameters of the first and the second parameter domain are parameters that refer to time-frequency analysis and time-frequency synthesis, and the first and the second parameter domain use different time-frequency analysis and/or different time-frequency synthesis.

28. The device according to claim 17, wherein the parameters of each frame of the first parameter domain affect more than one frame of the second parameter domain, and represent the waveform of the audio signal.

* * * * *